(12) United States Patent
Matsuda et al.

(10) Patent No.: US 8,078,335 B2
(45) Date of Patent: Dec. 13, 2011

(54) STORAGE SYSTEM, STORAGE SYSTEM CONTROL METHOD AND STORAGE SYSTEM CONTROL APPARATUS

(75) Inventors: Shinnosuke Matsuda, Kawasaki (JP); Takanori Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/342,549

(22) Filed: Dec. 23, 2008

(65) Prior Publication Data

US 2009/0171473 A1 Jul. 2, 2009

(30) Foreign Application Priority Data

Dec. 27, 2007 (JP) ................................. 2007-337227

(51) Int. Cl.
*G05D 23/00* (2006.01)
(52) U.S. Cl. ............ 700/300; 700/20; 700/44; 700/304; 714/6.21; 713/330; 710/300
(58) Field of Classification Search .................... 700/20, 700/300; 361/688, 679.01, 679.02; 318/461, 318/471–473; 714/6.21, 6.22
See application file for complete search history.

(56) References Cited

U.S. PATENT DOCUMENTS

| | | | | | |
|---|---|---|---|---|---|
| 5,963,887 | A | * | 10/1999 | Giorgio | 702/64 |
| 6,037,732 | A | * | 3/2000 | Alfano et al. | 318/471 |
| 6,318,965 | B1 | * | 11/2001 | Nair | 417/2 |
| 6,400,045 | B1 | * | 6/2002 | Hosokawa et al. | 307/117 |
| 6,791,209 | B2 | * | 9/2004 | Aldridge et al. | 307/65 |
| 6,825,625 | B1 | | 11/2004 | Karwath et al. | |
| 6,996,441 | B1 | * | 2/2006 | Tobias | 700/44 |
| 7,215,541 | B2 | * | 5/2007 | Nelson | 361/690 |
| 7,294,980 | B2 | * | 11/2007 | Ma et al. | 318/49 |
| 7,331,532 | B2 | * | 2/2008 | Currie et al. | 236/49.3 |
| 7,437,585 | B2 | * | 10/2008 | Nakano et al. | 713/330 |
| 7,483,270 | B2 | * | 1/2009 | Blake | 361/679.48 |
| 7,894,191 | B2 | * | 2/2011 | Tsuchiya | 361/695 |
| 2003/0220721 | A1 | | 11/2003 | Cohen | |
| 2006/0232914 | A1 | | 10/2006 | Hori et al. | |
| 2007/0171607 | A1 | | 7/2007 | Tanaka | |
| 2008/0005256 | A1 | | 1/2008 | Shibayama et al. | |

FOREIGN PATENT DOCUMENTS

| | | |
|---|---|---|
| JP | 4-120129 | 10/1992 |
| JP | 9-308101 | 11/1997 |
| JP | 10-283125 | 10/1998 |
| JP | 2002-157216 | 5/2002 |
| JP | 2002-518979 | 6/2002 |
| JP | 2003-345465 | 12/2003 |
| JP | 2005-260828 | 9/2005 |
| JP | 2006-294180 | 10/2006 |
| JP | 2007-179655 | 7/2007 |
| WO | 2006/085358 A1 | 8/2006 |

* cited by examiner

*Primary Examiner* — Dave Robertson
(74) *Attorney, Agent, or Firm* — Staas & Halsey LLP (57) ABSTRACT

A storage system includes a housing, a cooling unit cooling the interior of the housing, and a plurality of control units adapted to control the cooling unit. The control units each include a mount state acquisition unit acquiring a mount state of the control unit in the housing, an operation state acquisition unit acquiring an operation state of the cooling unit, and a determining unit determining a provisional main control unit, from among the plurality of control units, that is operable to control the entire cooling unit based on information acquired from the mount state acquisition unit and the operation state acquisition unit.

16 Claims, 6 Drawing Sheets

| GENERAL FUNCTION | SERVICES |
|---|---|
| CPU-IF | – CONNECTED WITH CPU VIA LOCAL BUS<br>– RESPONDS TO WRITE/READ OPERATION FROM CPU<br>– WRITE/READ INTO/FROM INTERNAL REGISTER OF PLD<br>– WRITE/READ INTO/FROM NVRAM<br>– CONTROL XO_FCS_N [1:0] IN ACCORDANCE WITH NMEM_ACT SURFACE SETTING |
| Exp-IF | – CONNECTED WITH EXPANDER BY LOCAL BUS<br>– RESPONDS TO WRITE/READ OPERATION FROM EXPANDER |
| NVRAM-IF | – WRITE/READ INTO/FROM NVRAM |
| INTER-PLD I/F | – CONDUCT INTER-PLD COMMUNICATION<br>– RECEIVE FROM PLD OF OTHER SYSTEMS AND EXECUTE INSTRUCTIONS FROM OTHER SYSTEMS<br>– DETECT INTER-PLD COMMUNICATION ERROR |
| POWER SUPPLY CONTROL | – JUDGE POWER ON (DC-ON)<br>– EXECUTE POWER-ON SEQUENCE WITH POWER ON (DC-ON)<br>– JUDGE POWER INTERRUPTION (DC-OFF) |
| UPS CONTROL | – MONITOR AND CONTROL UPS VOLTAGE (INTERLOCKED WITH POWER SUPPLY) IN ACCORDANCE WITH CPU COMMAND |
| PSU CONTROL | – MONITOR AND CONTROL PSU |
| POWER FAILURE CONTROL | – DETECT POWER FAILURE, NOTIFY CPU EXPANDER AND CONTROL AFTER POWER FAILURE<br>– DETECT FAULTY POWER FAILURE AND SWITCH DC OFF<br>– START BBU DISCHARGE IN ACCORDANCE WITH CPU COMMAND (CPU EXECUTES PROCESS UPON DETECTION OF POWER FAILURE) |
| SCU DISCHARGE | – DISCHARGE SCU |
| SWITCH FLASH ACT SURFACE | – CONTROL FLASH ACT SURFACE<br>– SET ACT SURFACE IN ACCORDANCE WITH SWITCH COMMAND FROM FIRMWARE IN ELECTRIC CONDUCTION (SET AT ANY TIME DURING OPERATION) |
| EXTERNAL RESET CONTROL | – PERFORM RESET CONTROL (RESET CPU, Exp, FE-Exp, I2C)<br>– CONTROL BUS SWITCH |
| KILL CONTROL | – CONTROL KILL IN LOCAL AND OTHER SYSTEMS |
| UNIT IDENTIFICATION | – REFLECT UNIT ID CODE ON REGISTER |
| INTERRUPT | – CONTROL INTERRUPT INTO CPU/Exp |
| 1-BYTE MESSAGE COMMUNICATION | – CONDUCT 1-BYTE MESSAGE COMMUNICATION BETWEEN CPU/Exp |
| INTERRUPT | – CONTROL INTERRUPT INTO CPU/Exp |
| WDT MONITOR | – CONTROL WDT MONITOR (Exp/CPU) |
| ALARM MONITOR | – MONITOR AND NOTIFY ALARM |
| MOUNT MONITOR | – MONITOR AND NOTIFY MOUNT SIGNAL |
| FAN MONITOR AND CONTROL | – MONITOR AND CONTROL FAN SPEED<br>– DETERMINE HW MASTER DURING DC-ON |
| LED CONTROL | – CONTROL LED |

*FIG. 4*

| NAME OF CONNECTOR PIN | |
|---|---|
| MNT | MOUNT SIGNAL INDICATES CM MOUNT IN SLOT MOUNTED WHEN LOW |
| O_P | NOTIFY OTHER CMs MOUNTED IN SLOT THAT CM IS NORMALLY MOUNTED<br>CONNECTED WITH INDIVIDUAL SIGNAL LINE AT EACH SLOT POSITION WHERE CM IS MOUNTED |
| I_P0 | SIGNAL NOTIFYING MOUNT IN SLOT 0 TO OTHER SLOTS ASSUMES HIGH LEVEL WHEN CM IS MOUNTED IN SLOT 0<br>SLOT CM0 IS FIXED TO LOW LEVEL |
| I_P1 | SIGNAL NOTIFYING MOUNT IN SLOT 1 TO OTHER SLOTS ASSUMES HIGH LEVEL WHEN CM IS MOUNTED IN SLOT 1<br>SLOT CM1 IS FIXED TO LOW LEVEL |
| I_P2 | SIGNAL NOTIFYING MOUNT IN SLOT 2 TO OTHER SLOTS ASSUMES HIGH LEVEL WHEN CM IS MOUNTED IN SLOT 2<br>SLOT CM2 IS FIXED TO LOW LEVEL |
| I_P3 | SIGNAL NOTIFYING MOUNT IN SLOT 3 TO OTHER SLOTS ASSUMES HIGH LEVEL WHEN CM IS MOUNTED IN SLOT 3<br>SLOT CM3 IS FIXED TO LOW LEVEL |

FIG. 5 a) NORMAL MODE

|     | OP | I_P0 | I_P1 | I_P2 | I_P3 (LSB) | ID |
|-----|----|------|------|------|------------|----|
| CM0 | 1  | 0    | 1    | 1    | 1          | 7  |
| CM1 | 1  | 1    | 0    | 1    | 1          | 11 |
| CM2 | 1  | 1    | 1    | 0    | 1          | 13 |
| CM3 | 1  | 1    | 1    | 1    | 0          | 14 | b) CM0 UNABLE TO DETECT FAN SPEED

|     | OP | I_P0 | I_P1 | I_P2 | I_P3 (LSB) | ID |
|-----|----|------|------|------|------------|----|
| CM0 | 0  | 0    | 1    | 1    | 1          | 7  |
| CM1 | 1  | 0    | 0    | 1    | 1          | 3  |
| CM2 | 1  | 0    | 1    | 0    | 1          | 5  |
| CM3 | 1  | 0    | 1    | 1    | 0          | 6  | c) CM1 UNABLE TO DETECT FAN SPEED

|     | OP | I_P0 | I_P1 | I_P2 | I_P3 (LSB) | ID |
|-----|----|------|------|------|------------|----|
| CM0 | 1  | 0    | 0    | 1    | 1          | 3  |
| CM1 | 0  | 1    | 0    | 1    | 1          | 11 |
| CM2 | 1  | 1    | 0    | 0    | 1          | 9  |
| CM3 | 1  | 1    | 0    | 1    | 0          | 10 | d) CM2 UNABLE TO DETECT FAN SPEED

|     | OP | I_P0 | I_P1 | I_P2 | I_P3 (LSB) | ID |
|-----|----|------|------|------|------------|----|
| CM0 | 1  | 0    | 1    | 0    | 1          | 5  |
| CM1 | 1  | 1    | 0    | 0    | 1          | 9  |
| CM2 | 0  | 1    | 1    | 0    | 1          | 13 |
| CM3 | 1  | 1    | 1    | 0    | 0          | 12 | e) CM3 UNABLE TO DETECT FAN SPEED

|     | OP | I_P0 | I_P1 | I_P2 | I_P3 (LSB) | ID |
|-----|----|------|------|------|------------|----|
| CM0 | 1  | 0    | 1    | 1    | 0          | 6  |
| CM1 | 1  | 1    | 0    | 1    | 0          | 10 |
| CM2 | 1  | 1    | 1    | 0    | 0          | 12 |
| CM3 | 0  | 1    | 1    | 1    | 0          | 14 | f) CM0, 2 UNABLE TO DETECT FAN SPEED

|     | OP | I_P0 | I_P1 | I_P2 | I_P3 (LSB) | ID |
|-----|----|------|------|------|------------|----|
| CM0 | 0  | 0    | 1    | 0    | 1          | 5  |
| CM1 | 1  | 0    | 0    | 0    | 1          | 1  |
| CM2 | 0  | 0    | 1    | 0    | 1          | 5  |
| CM3 | 1  | 0    | 1    | 0    | 0          | 4  | g) CM0, 2, 3 UNABLE TO DETECT FAN SPEED

|     | OP | I_P0 | I_P1 | I_P2 | I_P3 (LSB) | ID |
|-----|----|------|------|------|------------|----|
| CM0 | 0  | 0    | 1    | 0    | 0          | 4  |
| CM1 | 1  | 0    | 0    | 0    | 0          | 0  |
| CM2 | 0  | 0    | 1    | 0    | 0          | 4  |
| CM3 | 0  | 0    | 1    | 0    | 0          | 4  | h) ALL CM UNABLE TO DETECT FAN SPEED (FANC OUT OF ORDER)

|     | OP | I_P0 | I_P1 | I_P2 | I_P3 (LSB) | ID |
|-----|----|------|------|------|------------|----|
| CM0 | 0  | 0    | 0    | 0    | 0          | 0  |
| CM1 | 0  | 0    | 0    | 0    | 0          | 0  |
| CM2 | 0  | 0    | 0    | 0    | 0          | 0  |
| CM3 | 0  | 0    | 0    | 0    | 0          | 0  |

# STORAGE SYSTEM, STORAGE SYSTEM CONTROL METHOD AND STORAGE SYSTEM CONTROL APPARATUS

CROSS REFERENCES TO RELATED APPLICATIONS

This application is related to and claims priority to Japanese patent application no. 2007-337227 filed on Dec. 27, 2007 in the Japan Patent Office, the entire contents of which are incorporated by reference herein.

BACKGROUND OF THE INVENTION

1. Field of the Invention

The present invention relates to a storage system having a cooling unit, a storage system control method and a storage system control apparatus.

2. Description of the Related Art

A storage system operated as a RAID (redundant array of independent disks) using plural storage devices has such a structure in which two or more modules are mounted to double the functions. Also, a configuration including a cooling unit to discharge the heat of the disk array unit is disclosed in Japanese Patent Application Laid-Open Nos. 2007-179655 and 10-283125. This configuration also has plural cooling fans and modules for controlling the cooling fans to double the functions.

Incidentally, in controlling the cooling fan, the output of the cooling fan is desirably changed in accordance with the heating value as disclosed by Japanese Patent Application Laid-Open No. 2003-345465 and Japanese Patent Application National Publication No. 2002-518979. As these cooling fans, a multistage fan, for example, controlled by PWM (pulse width modulation) is used. After fully starting the device firmware and determining a control master controller module, the control operation is performed by generating the fan rotation speed control pulse in accordance with a command of the firmware of the control module (CM).

In the prior art, however, the fan rotation speed cannot be controlled before the firmware is fully started and the control master controller module is determined. During the time from the DC power on of the apparatus to the firmware start, therefore, the fan rotation speed cannot be set.

The fan rotation is controlled from each controller module by PWM. As long as the control master CM is not determined, the control frequency of each controller module CM cannot be synchronized. An attempt to control the rotation speed in multiple stages, therefore, would imbalance the rotation speed and cause a swell. As a result, the hardware control is limited to two values of the maximum speed rotation (100% in duty factor) and the fan rotation stop (0% in duty factor).

In a case where the fan rotation stop mode (0% in duty factor) is set by hardware control, the heat cannot be discharged from the apparatus. In a high temperature environment of the apparatus, therefore, the start fault may be caused, and therefore, the fan rotation stop cannot be set by hardware control. In the presently available RAID, the fan is set to the maximum rotation speed (100% in duty factor) by hardware control before the control master CM is determined. Although the heat can be discharged from the apparatus, the fan rotation noise poses a problem.

In one proposed solution, like in the high-end RAID, for example, a module management controller (MMC) driven by a resident power supply in a different system than the DC power-on input is used to monitor the apparatus status before DC power on, and the fan rotation speed is controlled to an optimum rotation speed before determining the control master CM. Since the addition of MMC is required, however, this method harbors the problem of an increased package space and an increased cost.

SUMMARY

Various embodiments of the present invention provide a storage system including a housing, a cooling unit configured to cool an interior of the housing, and a plurality of control units adapted to control the cooling unit. The control units each include a package state acquisition unit acquiring the package state of the control unit, an operation state acquisition unit acquiring the operation state of the cooling unit, and a determining unit determining a provisional main control unit, from among the plurality of control units, that is operable to control the entire cooling unit based on information acquired from the mount state acquisition unit and the operation state acquisition unit.

Various embodiments of the present invention provide a method of controlling a storage system including a plurality of control unit adapted to control a cooling unit for cooling an interior of a housing, the method including acquiring a mount state of each of the control units within the housing, acquiring an operation state of the cooling unit, determining a provisional main control unit, from among the plurality of control units, that is operable to provisionally control the entire cooling unit based on the acquired mount state and the acquired cooling unit operation state, and controlling the cooling unit by the determined provisional main control unit.

Various embodiments of the present invention provide a control apparatus adapted to control a cooling unit for cooling an interior of a housing, the control apparatus including a mount state acquisition unit acquiring a mount state of the control apparatus, an operation state acquisition unit acquiring an operation state of the cooling unit, a determining unit determining a provisional main control apparatus, from among a plurality of control apparatus provided in the storage system, that is operable to provisionally control the cooling unit based on the information acquired from the mount state acquisition unit and the operation state acquisition unit, and a cooling unit control unit controlling the cooling unit when the local apparatus is determined as the provisional main control apparatus.

BRIEF DESCRIPTION OF THE DRAWINGS

FIG. 3 is a diagram describing the function of the PLD shown in FIG. 2;

DESCRIPTION OF THE PREFERRED EMBODIMENT

The storage system, the storage system control method and the storage system control apparatus according to an embodiment will be described in detail below with reference to the drawings.

Figure 1:
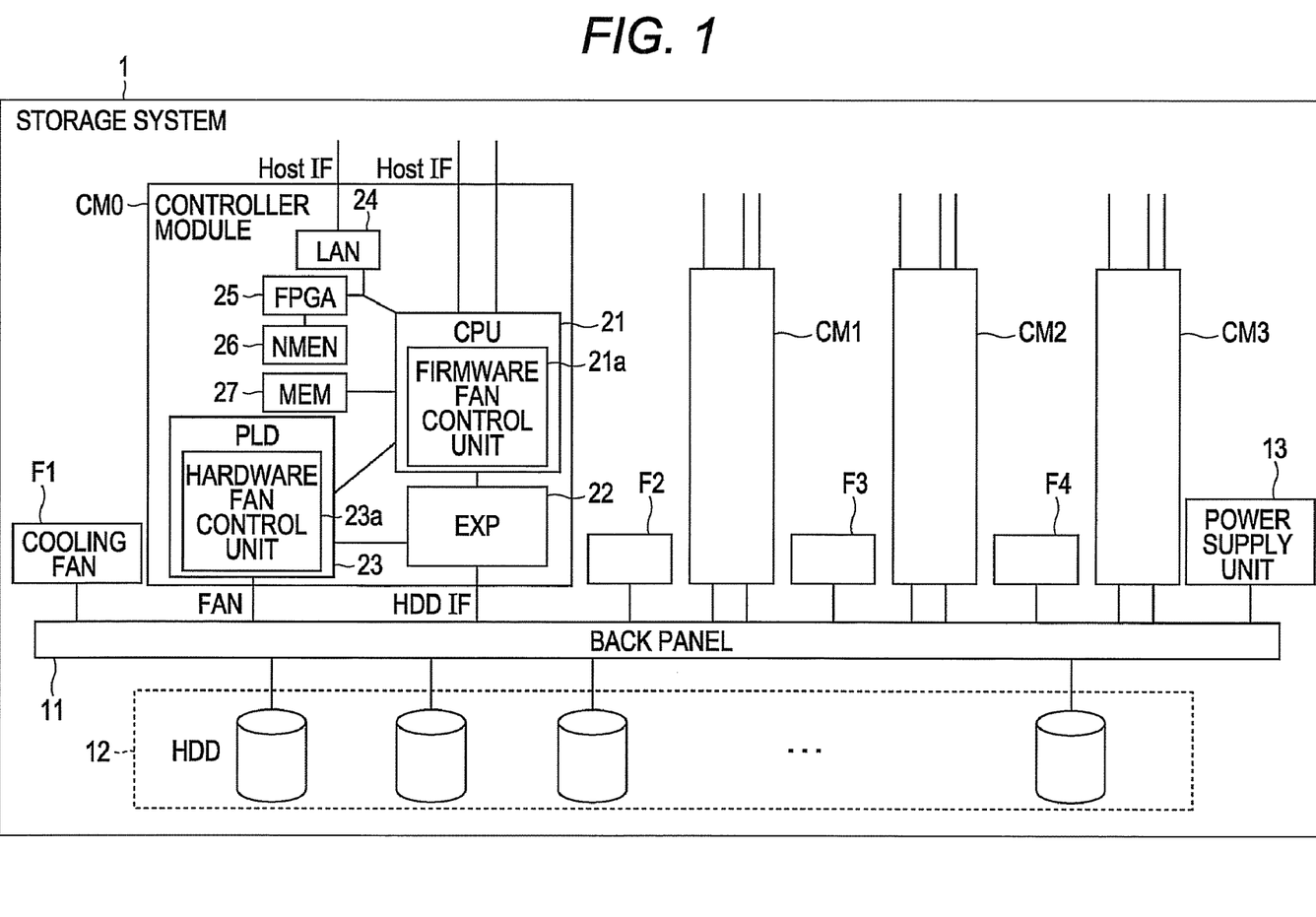
FIG. 1 is a schematic diagram showing a general configuration of the storage system according to this invention.

FIG. 1 is a schematic diagram showing a general configuration of the storage system 1. As shown in FIG. 1, the storage system 1 includes, in the housing thereof, four controller modules (CM0 to CM3), four cooling fans (F1 to F4), a back panel 11, plural HDDs (hard disk drives) 12 that are storage devices and a power supply unit 13.

The plural cooling fans F1 to F4 are arranged in the housing of the storage system 1 to cool the apparatus as a whole. The power supply unit 13 is a module for supplying power to each component of the storage system 1. The power supply unit 13 is connected to the modules including the controller modules, the cooling fans and the HDDs through the back panel 11.

Also, the back panel 11 connects each of the controller modules (CM0 to CM3), the cooling fans (F1 to F4) and the hard disk devices in the HDDs 12 to each other. Specifically, each controller module is connected to all the cooling fans and all the hard disk devices.

The controller modules CM0 to CM3 are controller cards each having a processor. By executing a dedicated firmware for controlling the storage system 1 constituting the RAID by use of the processor, the controller modules CM0 to CM3 operate as a storage system control apparatus.

The internal configuration of the controller module is described, taking the controller module CM0 as an example. The controller module CM0, as shown in FIG. 1, includes therein a CPU (central processing unit) 21, an expander (EXP) 22 that is a LSI (large scale integration) for controlling an interface with the HDD, a LAN 24 that is a chip for LAN connection with an external device, such as the host of the storage system 1, a FPGA (field programmable gate array) 25 that is a custom LSI, a nonvolatile memory NMEM 26, a volatile memory MEM 27 and a programmable logic device (PLD) 23 that is a unit controller to monitor and control an internal state of the control master CM.

The firmware executed by the controller module 1 includes a program for controlling the operation of the cooling fans. The CPU 21 functions as a firmware fan control unit 21a by executing the program to control the operation of the cooling fans. In the process, the temperature in the housing is acquired by a temperature sensor (not shown) to thereby to determine the optimum fan rotation speed.

The firmware fan control unit 21a, however, works only after starting the firmware. Therefore, the PLD 23 of the storage system 1 includes a hardware fan control unit 23a for controlling the cooling fans by hardware.

This hardware control unit 23a can take charge of controlling the cooling fans before the firmware is completely started and the operation to control the cooling fans by the firmware control unit 21a becomes possible after switching on the controller module. Also in the fan control operation by hardware, like in the fan control operation by firmware, the temperature in the housing can be acquired by a temperature sensor (not shown) and the fan rotation speed can be controlled to an optimum value.

The controller modules CM1, CM2, CM3 have a similar configuration to the controller module CM0 and each include a hardware fan control unit. In a case where plural cooling fans are controlled by different controller modules, the fan rotation speed would be unbalanced and a swell would be generated. Therefore, the hardware fan control unit of any one of the controller modules is required to be determined as a provisional main control unit for hardware fan control so that the hardware fan control unit of the controller module thus determined may collectively control all the cooling fans.

Figure 2:
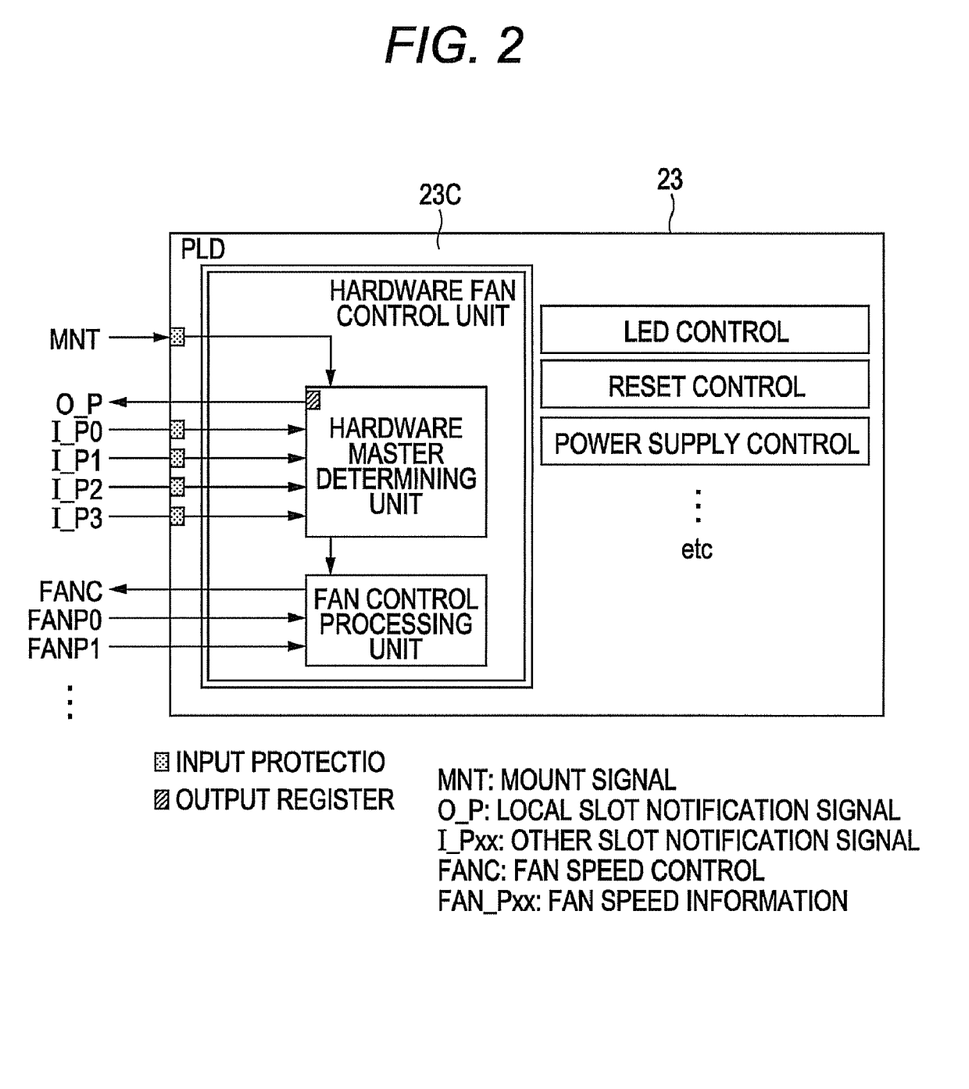
FIG. 2 is a schematic diagram for describing a general configuration of the PLD (programmable logic device) shown in FIG. 1.

FIG. 2 is a diagram describing the internal configuration of the PLD 23. The PLD 23 includes therein a hardware fan control unit 23a in addition to an LED control unit, a reset control unit and a power supply control unit.

FIG. 3 shows a specific example of functions of the PLD 23. As shown in FIG. 3, "CPU-IF" is connected to the CPU through a local bus and responds to the write and read operation from the CPU. Also, "CPU-IF" controls the write and read operation into and from the internal register of the PLD and the write and read operation into and from NVRAM and XO_FCS_N[1:0] in accordance with the NMEM_ACT screen setting.

"Exp-IF" is connected to the expander 22 through a local bus and responds to the write and read operation from the expander 22. "NVRAM-IF" is a function to write into and read from NVRAM, and "inter-PLD I/F" has a function of transmitting signals between the PLDs, receiving signals from the PLDs of other systems, executing the instructions from other systems and detecting an error in communication between the PLDs.

"Power supply control" judges a power on (DC-on) and, in power-on (DC-on) mode, switches on power to execute the power-on sequence. Also, a power-off state (DC-off) is judged. A "UPS (uninterruptible power supply) control" monitors and controls (power-interlocked control) a UPS voltage in response to a CPU command. Also, a "PSU (power supply unit) control" is a function of monitoring and controlling the power supply unit (PSU).

"Power failure control" detects a power failure, notifies CPUExp and performs the control operation after the power failure. In a case where an anomalous power failure state is detected, power is set to DC-off state. Also, a BBU (battery backup unit) discharge is started in response to a CPU command. In other words, the CPU starts operation upon detection of a power failure.

"SCU discharge" is the function to discharge a SCU, and "FlashACT screen switch" controls FlashACT screen and sets ACT screen in response to a switch command from the firmware in operation. The ACT screen can be always set as long as the storage system 1 is in operation.

"External reset control" is a function of reset control (CPU, Exp, FE-Exp, I2C) and bus switch control. "KILL control" is a function of controlling KILL of local and other systems. "Unit identification" is a function of reflecting the unit identification code on the register. Further, "interrupt" is a function of controlling an interrupt into CPU/Exp, and "1-byte message communication" is a function of 1-byte message communication between CPU and Exp.

"WDT monitor" is a function of controlling a WDT monitor (Exp/CPU), "alarm monitor" is a function of monitoring and notifying an alarm, and "LED control" is a function of controlling the LED.

Further, the hardware fan control unit 23a has "mount monitor" function for monitoring a mount signal and making a notification, and "fan monitor and control" function for determining a hardware master (HW master) with DC-on and monitoring and controlling the rotation speed of the cooling fans.

Referring back to FIG. 2, the hardware fan control unit 23a is further described. The hardware fan control unit 23a includes therein a hardware master determining unit and a fan control processing unit.

The hardware master determining unit determines whether the hardware fan control unit of any one of the controller modules should be operated as a provisional main control unit or not, based on a mount state of the controller module. The provisional main control unit thus determined is hereinafter referred to as a hardware master.

Figure 4:
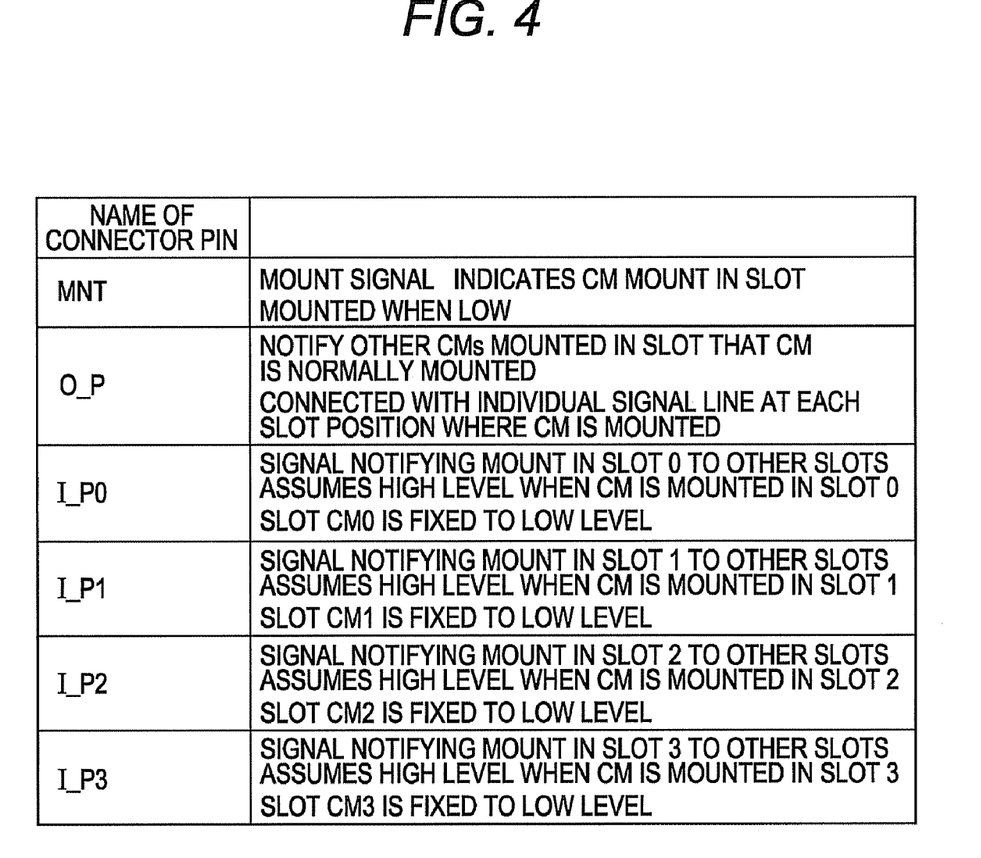
FIG. 4 is a diagram describing the input/output signals of the PLD shown in FIG. 2.

The hardware master determining unit, as shown in FIG. 2, is supplied with the mount signal (MNT) and the other slot notification signal (I_Pxx). The mount signal, as shown in FIG. 4, indicates that the local controller module CM is mounted in the slot and indicates that the CM is in the mounted state at low level. The hardware master determining unit outputs a local slot notification signal (O_P) to the other controller modules when MNT becomes low level. The local slot notification signal notifies the controller module CM mounted in another slot that the local controller module CM is normally mounted and is connected to an individual signal line at the slot position where the controller module CM is mounted.

The other slot notification signal I_P0 is a signal for notifying other slots that the controller module CM is mounted in slot 0, and becomes high level when the controller module CM is mounted in slot 0. Incidentally, the signal I_P0 in slot 0 is fixed at low level.

The other slot notification signal I_P1 is a signal for notifying other slots that the controller module CM is mounted in slot 1 and becomes high level when the controller module CM is mounted in slot 1. Incidentally, the signal I_P1 in slot CM1 is fixed at low level.

The other slot notification signal I_P2 is a signal for notifying other slots that the controller module CM is mounted in slot 2 and becomes high level when the controller module CM is mounted in slot 2. Incidentally, the signal I_P2 in slot CM2 is fixed at low level.

The other slot notification signal I_P3 is a signal for notifying other slots that the controller module CM is mounted in slot 3 and becomes high level when the controller module CM is mounted in slot 3. Incidentally, the signal I_P3 in slot CM3 is fixed at low level.

Specifically, the controller module that has recognized that it is mounted in the apparatus slot sends out the signal O_P, and this signal constitutes I_P# in other slots.

The hardware master determining unit recognizes the signals I_P0 to I_P3 as a 4-bit ID number, and determines as a hardware master the controller module corresponding to the minimum ID of all the controller modules mounted normally in the apparatus slots and outputs the signal O_P.

The controller modules other than the hardware master guard the fan control without performing the fan control. After DC-on, therefore, only the fan control processing unit of the hardware master starts the fan control.

The fan control processing unit acquires fan rotation speed information (FANP0 to FANP3) from the cooling fans F1 to F4, respectively, and, based on the rotation speed information, determines the specifics of the rotation speed control and outputs them to the cooling fans F1 to F4 as fan speed control signals (FANC).

Suppose a case where a problem occurs and the hardware master fails to detect the rotation speed of the fans. The controller module judges that the fan rotation control from the hardware master cannot be carried out and release the hardware master by negating the signal O_P. By negating the signal O_P of the slot mounting the hardware master, signal I_P# to other slots is released and the next minimum ID is changed, so that the controller module having the next minimum ID becomes the hardware master.

In a case where the fan control cannot be carried out in all the slots, the fan control is judged as faulty, and the start operation is switched to the maximum rotation speed until the fan control is started by the firmware. This state of the fan control fault is stored as a start log in the hardware register unit in the controller module and recovered after starting the firmware.

Figure 5:
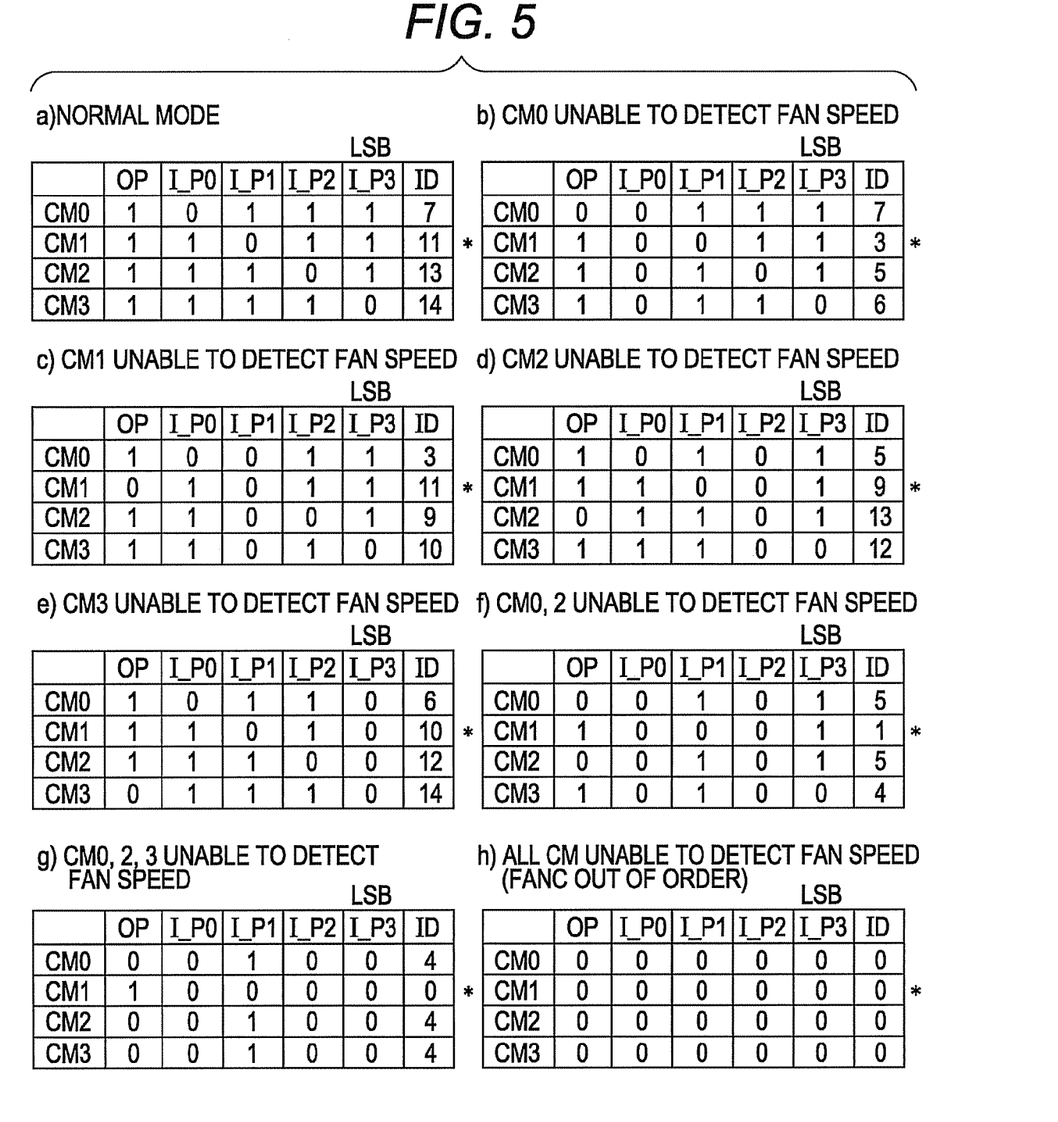
FIG. 5 is a diagram describing the determination of the hardware master.

FIG. 5 is a diagram for describing a hardware master determining method. As shown in FIG. 5, in the normal state with all the controller modules normally mounted, the values of the signals I_P0 to I_P3 in each controller are such that only the bit corresponding to the local slot is 0, while all the other bits are 1. Specifically, the ID of the controller module CM0 is "0111" in binary number and "7" in decimal number. The ID of the controller module CM1 is "1011" in binary number and "11" in decimal number. The ID of the controller module CM2 is "1101" in binary number and "13" in decimal number. The ID of the controller module CM3 is "1110" in binary number and "14" in decimal number. As a result, the controller module CM0 having the smallest ID is determined to be a hardware master.

In a case where the controller module CM0 cannot detect the fan rotation speed, all the signals I_P0 are 0, so that the ID of the controller module CM0 is "0111" in binary number and "7" in decimal number, while the ID of the controller module CM1 is "0011" in binary number and "3" in decimal number. Also, the ID of the controller module CM2 is "0101" in binary number and "5" in decimal number, while the ID of the controller module CM3 is "0110" in binary number and "6" in decimal number. As a result, the controller module CM1 having the smallest ID with the signal O_P determined 1, i.e. normally mounted in the apparatus slot that output the signal O_P, is determined as a hardware master.

Similarly, in a case where the controller module CM1 cannot detect the fan rotation speed, all the signals I_P1 are 0. Therefore, the ID of the controller module CM0 is "0011" in binary number and "3" in decimal number, while the ID of the controller module CM1 is "1011" in binary number and "11" in decimal number. Also, the ID of the controller module CM2 is "1001" in binary number and "9" in decimal number, while the ID of the controller module CM3 is "1010" in binary number and "10" in decimal number. As a result, the controller module CM0 having the smallest ID with the signal O_P at 1 is determined as a hardware master.

In a case where the controller module CM2 cannot detect the fan rotation speed, all the signals I_P2 are 0, and therefore, the ID of the controller module CM0 is "0101" in binary number and "5" in decimal number, while the ID of the controller module CM1 is "1001" in binary number and "9" in decimal number. Also, the ID of the controller module CM2 is "1101" in binary number and "13" in decimal number, while the ID of the controller module is "1100" in binary number and "12" in decimal number. As a result, the controller module CM0 with the signal O_P of 1 having the smallest ID is determined as a hardware master.

Similarly, in a case where the controller module CM3 cannot detect the fan rotation speed, all the signals I_P3 are 0, and therefore, the ID of the controller module CM0 is "0110" in binary number and "6" in decimal number, while the ID of the controller module CM1 is "1010" in binary number and "10" in decimal number. Also, the ID of the controller module CM2 is "1110" in binary number and "12" in decimal number, while the ID of the controller module is "1110" in binary number and "14" in decimal number. As a result, the controller module CM0 with the smallest ID having the signal O_P of 1 is determined as a hardware master.

In a case where the controller modules CM0 and CM2 cannot detect the fan rotation speed, the signals I_P0 and I_P2 are both 0, and therefore, the ID of the controller module CM0 is "0101" in binary number and "5" in decimal number, while the ID of the controller module CM1 is "0001" in binary number and "1" in decimal number. Also, the ID of the controller module CM2 is "0101" in binary number and "5" in decimal number, while the ID of the controller module CM3 is "0100" in binary number and "4" in decimal number. As a result, the controller module CM1 with the smallest ID having the signal O_P of 1 is determined as a hardware master.

Further, in a case where the controller modules CM0, CM2 and CM3 cannot detect the fan rotation speed, all the signals I_P0, I_P2 and I_P3 are 0, and therefore, the ID of the controller module CM0 is "0100" in binary number and "4" in decimal number, while the ID of the controller module CM1 is "0000" in binary number and "0" in decimal number. Also, the ID of the controller module CM2 is "0100" in binary number and "4" in decimal number, while the ID of the controller module CM3 is "0100" in binary number and "4" in decimal number. As a result, the controller module CM1 with the smallest ID having the signal O_P of 1 is determined as a hardware master.

In a case where all the controller modules fail to detect the fan rotation speed, all of the signals I_P0 to I_P4 are 0 and so are all the IDs of the controller modules. In this case, as described above, the fan control is judged as faulty and the fan is controlled at the maximum rotation speed until the fan comes to be controlled by firmware.

Figure 6:
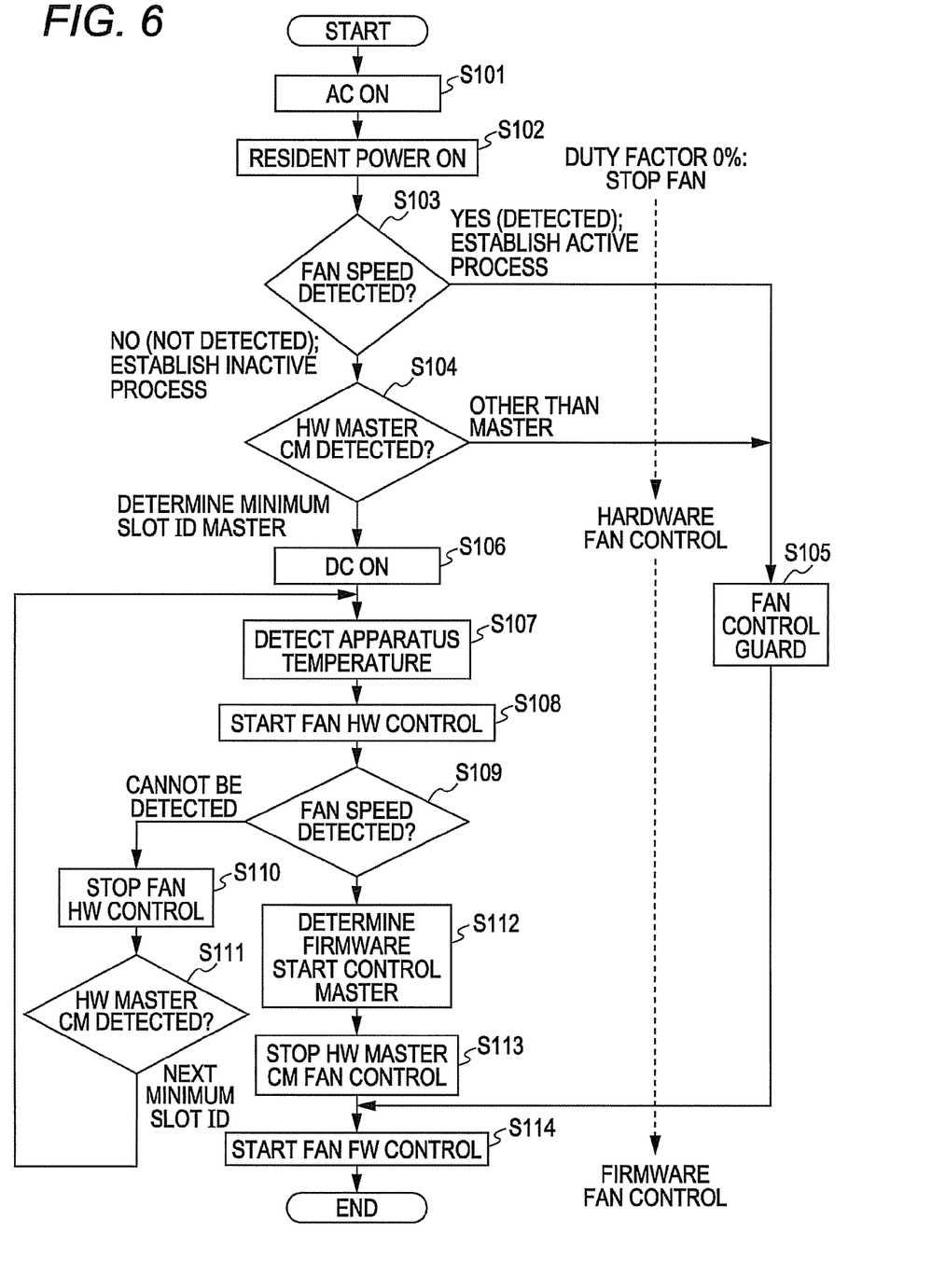
FIG. 6 is a flowchart for describing the hardware control process of the cooling fan.

FIG. 6 is a flowchart for describing a process of hardware control (control by PLD) of the cooling fans in the storage system 1. As shown in FIG. 6, once the apparatus is switched on with AC input (operation S101), the resident power supply is switched on by the power supply unit 13 (operation S102).

Each controller module judges whether the rotation speed information (FANP0 to FANP3) input to the fan controller driven by the resident power supply mounted in the module can be detected. Upon detection of the rotation speed information thereof (YES in operation S103), the time at which the CM active switch-on time of the apparatus, i.e. the fact that the local module is mounted with other controller modules already mounted and operated, is detected, thereby indicating that the fan control by hardware is carried out (DC-on state). In this case, the controller module that has detected the rotation speed information (FANP0 to FANP3) executes the fan control guard process (operation S105) until the fan control by firmware is started in such a manner as not to affect the controller modules CM of other systems already carrying out the fan control by hardware (operation S114).

In a case where the fan rotation information is not detected by each controller module (NO in operation S103), on the other hand, the inactive switch-on, i.e. the state waiting for DC-on, prevails. In this case, the mount notification signal from the back panel is monitored, and the controller module having the smallest slot ID (YES in operation S104) becomes the hardware master controller module and takes charge of the hardware fan control. Incidentally, the controller module other than the hardware master (NO in operation S104) carries out the fan control guard process (operation S105).

Now, the controller module that has become the hardware master issues a DC input command (operation S106), detects the internal temperature of the apparatus (operation S107), and, by setting the fan rotation speed at an optimum value, starts the fan control operation (operation S108). After starting the fan control, the fan rotation speed and the apparatus temperature are monitored until the firmware start is completed.

In a case where the hardware master cannot detect the fan rotation speed during the hardware fan control (NO in operation S109), the hardware master stops the fan control (operation S110) and cancels the mount notification signal. Then, the controller module of the next minimum slot ID becomes the hardware master and performs the hardware control (operation S111).

After completion of the firmware start, the master controller module for firmware control (firmware master) is determined (operation S112). Then, the hardware master that is determined as a provisional main control unit cancels the hardware control (operation S113), and the fan control by firmware is started (operation S114).

As described above, according to this embodiment, the hardware of the storage system is equipped with the function of determining the hardware master to control the rotation of the cooling fan by hardware, the function of monitoring the internal temperature of the apparatus and controlling the fan rotation speed at an optimum value and the function of judging whether the apparatus start is inactive or active, so that the hardware master controls the operation of the cooling fan provisionally until the firmware starts.

As a result, the fan rotation speed control adapted for the environmental temperature of the apparatus and the optimum fan rotation control capable of reducing the noises while at the same time discharging the heat from within the apparatus can be carried out until the firmware start after the DC-on of the apparatus. In the process, the addition of the module management controller (MMC), or the like, is not required, and, therefore, both mounting space and cost can be suppressed.

The configuration and operation shown in this embodiment are only an example, to which the invention is not limited to this. Various modifications and alterations are possible without departing from the scope of the invention.

In the above, description of this embodiments has been made of a case where the fan is used as the cooling unit. The invention is, on the other hand, equally applicable to a case where a water cooling mechanism or other cooling units is used.

Also, in spite of the foregoing description of the configuration having control units (control modules) and disks in a single housing, the control unit and the disks may be encased in plural different housings.

Further, according to the description made above for this embodiment, the hardware master is changed to other modules in a case where the fan rotation speed cannot be confirmed after determining the hardware master. Nevertheless, configuration of the embodiment can be such that only the controller module that could confirm the fan rotation, i.e. that has acquired the qualification to become the hardware master, can notify the other controller modules.

Additionally, the cooling fans can be controlled using other information than the rotation speed and the housing temperature. In a case where a fault is detected in any one of the cooling fans, for example, the control configuration may be employed to improve the cooling capacity of the remaining cooling units.

What is claimed is:

1. A storage system comprising:
   a housing;
   a cooling unit configured to cool an interior of the housing; and
   a plurality of control units adapted to control the cooling unit, wherein each of the control units includes a mount state acquisition unit acquiring a mount state of the control unit, an operation state acquisition unit acquiring an operation state of the cooling unit, and
   a determining unit for determining a provisional main control unit, from among the plurality of control units, that is operable to control the entire cooling unit based on information acquired from the mount state acquisition unit and the operation state acquisition unit, and
   wherein the control unit determined as the provisional main control unit operates to control the entire cooling unit prior to a complete starting of an in-operation cooling control unit that takes charge of the control of the cooling unit during the operation of the storage system.

2. The storage system according to claim 1, wherein each of the control units acquire a mounted position of each respective control unit within the housing from the mount state acquisition unit and determine the provisional main control unit based on the mount position of each of the control units.

3. The storage system according to claim 1, wherein the control unit determined as the provisional main control unit judges an own mount state as faulty and determines another control unit, from among the plurality of control units, as a subsequent provisional main control unit when the provisional main control unit cannot acquire the state of the cooling unit from the operation state acquisition unit.

4. The storage system according to claim 1, wherein each of the control units, upon a confirmation of the operation of the cooling unit from the operation state acquisition unit, notifies an own mount state to each of the other control units.

5. The storage system according to claim 1, further comprising a temperature monitor unit monitoring an internal temperature of the housing, wherein the provisional main control unit controls the cooling unit based on the monitoring of the temperature monitor.

6. The storage system according to claim 1, wherein a plurality of cooling units are provided in the storage system, and wherein the provisional main control unit improves, upon detection of a faulty of cooling unit, a cooling capacity of the remaining cooling units.

7. A method of controlling a storage system including a plurality of control units adapted to control a cooling unit for cooling an interior of a housing, comprising:
acquiring a mount state of each of the control units within the housing;
acquiring an operation state of the cooling unit;
determining a provisional main control unit, from among the plurality of control units, that is operable to provisionally control the entire cooling unit based on the acquired mount state and the acquired cooling unit operation state; and
controlling the cooling unit by the determined provisional main control unit,
wherein the control unit determined as the provisional main control unit operates to control the entire cooling unit prior to a complete starting of an in-operation cooling control unit that takes charge of the control of the cooling unit during the operation of the storage system.

8. The storage system control method according to claim 7, further comprising:
acquiring, by each of the control units, a mount position of each of the other control units; and
determining the provisional main control unit based on own mount position and the acquired mount position of the other control units.

9. The storage system control method according to claim 8, further comprising:
judging, by the control unit determined as the provisional main control unit, an own mount state as faulty when the provisional main control unit cannot acquire the operation state of the cooling unit, and determining another control unit as a subsequent provisional main control unit.

10. The storage system control method according to claim 7, further comprising:
notifying, by each of the control units, an own mount state to each of the other control units, upon a confirmation of the operation of the cooling unit.

11. The storage system control method according to claim 7, further comprising:
monitoring an internal temperature of the housing; and controlling the cooling unit based on the monitoring.

12. The storage system control method according to claim 7, wherein a plurality of cooling units is provided in the storage system;
and wherein the provisional main control unit, any of the cooling units is determined to be faulty, improves the cooling capacity of the remaining cooling units.

13. A control apparatus adapted to control a cooling unit for cooling an interior of a housing, the control apparatus comprising:
a mount state acquisition unit acquiring a mount state of the control apparatus;
an operation state acquisition unit acquiring an operation state of the cooling unit;
a determining unit for determining a provisional main control apparatus, from among a plurality of control apparatuses provided in a storage system, that is operable to provisionally control the cooling unit based on the information acquired from the mount state acquisition unit and the operation state acquisition unit; and
a cooling unit control unit controlling the cooling unit when a local apparatus is determined as the provisional main control apparatus,
wherein the control unit determined as the provisional main control unit operates to control the entire cooling unit prior to a complete starting of an in-operation cooling control unit that takes charge of the control of the cooling unit during the operation of the storage system.

14. The control apparatus according to claim 13, wherein the determining unit acquires a mount position of the control apparatus from the mount state acquisition unit and determines the provisional main control apparatus based on the mount position of the control apparatus.

15. The control apparatus according to claim 13, wherein, when the local apparatus is determined as the provisional main control apparatus and cannot acquire the state of the cooling unit from the operation state acquisition unit, the determining unit judges an own mount state as faulty and determines another control apparatus as the provisional main control apparatus.

16. The control apparatus according to claim 13, wherein the operation state acquisition unit, upon a confirmation of the operation of the cooling unit, notifies an own package state thereof to each of the other control apparatuses.

* * * * *